(12) United States Patent
Park (10) Patent No.: US 11,216,352 B2
(45) Date of Patent: Jan. 4, 2022

(54) METHOD FOR AUTOMATICALLY ANALYZING BOTTLENECK IN REAL TIME AND AN APPARATUS FOR PERFORMING THE METHOD

(71) Applicant: GREENISLE INC., Seoul (KR)

(72) Inventor: Byung Nyun Park, Hanam-si (KR)

(73) Assignee: GREENISLE INC., Seoul (KR)

( * ) Notice: Subject to any disclaimer, the term of this patent is extended or adjusted under 35 U.S.C. 154(b) by 89 days.

(21) Appl. No.: 16/616,177

(22) PCT Filed: Jun. 1, 2018

(86) PCT No.: PCT/KR2018/006272
§ 371 (c)(1),
(2) Date: Nov. 22, 2019

(87) PCT Pub. No.: WO2018/221998
PCT Pub. Date: Dec. 6, 2018

(65) Prior Publication Data
US 2020/0210307 A1 Jul. 2, 2020

(30) Foreign Application Priority Data
Jun. 2, 2017 (KR) .......................... 10-2017-0069012

(51) Int. Cl.
*G06F 11/00* (2006.01)
*G06F 11/34* (2006.01)
(Continued)

(52) U.S. Cl.
CPC ...... *G06F 11/3409* (2013.01); *G06F 11/3006* (2013.01); *G06F 11/321* (2013.01); *G06F 11/3447* (2013.01)

(58) Field of Classification Search
None
See application file for complete search history.

(56) References Cited

U.S. PATENT DOCUMENTS 8,875,108 B2 * 10/2014 Choi ................... G06F 11/3612
717/130
9,032,375 B2 * 5/2015 Kumar ................ G06F 11/3612
717/131
(Continued)

FOREIGN PATENT DOCUMENTS

KR 10-0906440 B1 7/2009
WO WO-2016174764 A1 * 11/2016 ............. H04L 69/40

OTHER PUBLICATIONS

Google Patents/Scholar—text refined (Year: 2021).*
Google Scholar/Patents—text refined (Year: 2021).*

*Primary Examiner* — Christopher S McCarthy
(74) *Attorney, Agent, or Firm* — Miles & Stockbridge P.C.

(57) ABSTRACT

The present invention relates to a method for automatically analyzing a bottleneck in real time and an apparatus for performing the method. The method for automatically analyzing a bottleneck in real time may comprise the steps of: an application server receiving a bottleneck analysis component; and the application server installing the bottleneck analysis component, wherein the bottleneck analysis component may add a call code for a performance information collector to an application installed on the application server that is to be monitored, wherein the bottleneck analysis component may call the performance information collector according to execution of a service function of the application, requested by a client, to generate service performance information for analyzing a bottleneck phenomenon.

9 Claims, 4 Drawing Sheets

(51) Int. Cl.
 *G06F 11/30* (2006.01)
 *G06F 11/32* (2006.01)

(56) References Cited

U.S. PATENT DOCUMENTS

| | | | |
|---|---|---|---|
| 9,323,651 B2 * | 4/2016 | Garrett | G06F 11/3466 |
| 9,652,355 B2 * | 5/2017 | Horikawa | G06F 11/3409 |
| 10,754,866 B2 * | 8/2020 | Kobayashi | G06F 3/0689 |
| 2009/0177642 A1 * | 7/2009 | Chung | G06F 11/3466 |
| 2012/0089724 A1 | 4/2012 | Liang et al. | |
| 2014/0282597 A1 | 9/2014 | Garrett et al. | |
| 2015/0227446 A1 | 8/2015 | Horikawa | |
| 2016/0034301 A1 | 2/2016 | Huang et al. | |

* cited by examiner

Fig. 4 of the present invention is
METHOD FOR AUTOMATICALLY ANALYZING BOTTLENECK IN REAL TIME AND AN APPARATUS FOR PERFORMING THE METHOD

PRIORITY INFORMATION

The present application is a national stage filing under 35 U.S.C. § 371 of PCT/KR2018/006272, filed on Jun. 1, 2018 which claims priority to KR Application No. 10-2017-0069012 filed on Jun. 2, 2017. The applications are incorporated herein by reference in their entirety.

TECHNICAL FIELD

The present invention relates to a method for automatically analyzing a bottleneck in real time and an apparatus for performing the method. More particularly, the present invention relates to a method for automatically analyzing a bottleneck in real time by effectively analyzing a large amount of performance monitoring information, and an apparatus for performing the method.

BACKGROUND ART

Various conventional techniques have been developed to analyze a bottleneck phenomenon.

In a conventional application performance management (APM) scheme, business function execution performance is collected for performance analysis on an application operating server, and collected performance information is stored in a remote server after transaction is terminated. However, in the APM scheme, only a small number (average 2,000) of pieces of call information may be collected due to a burden to a memory caused by storing the performance information until the termination of the transaction.

In a conventional profiler scheme, execution performance for all functions may be collected, and the performance information may be stored locally. However, the profiler scheme is not applicable to an actual operating server because of large overhead caused by collecting all function performance information. In addition, integrated performance monitoring may be impossible since the information is locally stored.

In a conventional dump analysis scheme, a currently running function call stack may be collected. In addition, a manual command execution scheme may be performed. However, the dump analysis scheme may be a snapshot image of a currently running stack. Actual bottleneck determination may rely on estimation. In addition, a time spent for the bottleneck may not be measured.

As described above, conventional performance monitoring techniques may not analyze a fundamental performance bottleneck point due to characteristics and constraints of the techniques, and have limitations in effectively analyzing performance problems.

Therefore, there is a demand for a method for automatically analyzing a bottleneck in a real-time (RT) scheme.

DETAILED DESCRIPTION OF THE INVENTION

Technical Problem

An object of the present invention is to solve all the above-described problems.

In addition, another object of the present invention is to automatically analyze a bottleneck phenomenon in real time through a real-time (RT) scheme capable of directly providing performance information of a running service rather than a near real-time (NRT) scheme for providing performance information after execution of an application service is terminated in order to immediately respond to performance problems.

In addition, still another object of the present invention is to collect and store a large amount of performance profile information such that performance overhead is reduced when storing the large amount of performance profile information to effectively analyze causes of the performance problems.

In addition, yet another object of the present invention is to automatically identify an exact bottleneck generation point and calculate a bottleneck time in real time when the bottleneck phenomenon occurs.

Technical Solution

The representative configuration of the present invention for achieving the above objects is as follows.

According to one aspect of the invention, a method for automatically analyzing a bottleneck in real time includes: receiving a bottleneck analysis component by an application server; and installing the bottleneck analysis component by the application server, wherein the bottleneck analysis component adds a call code for a performance information collector to an application installed on the application server that is a monitoring target, and the bottleneck analysis component generates service performance information for analyzing a bottleneck phenomenon by calling the performance information collector according to execution of a service function of the application requested by a client.

According to another aspect of the invention, an application server which is subject to automatic bottleneck analysis in real time includes: a communication unit implemented to receive a bottleneck analysis component; and a processor operatively connected with the communication unit, wherein the processor is implemented to install the bottleneck analysis component, the bottleneck analysis component adds a call code for a performance information collector to an application installed on the application server that is a monitoring target, and the bottleneck analysis component generates service performance information for analyzing a bottleneck phenomenon by calling the performance information collector according to execution of a service function of the application requested by a client.

Advantageous Effects of the Invention

According to the present invention, automatic analysis can be performed on a bottleneck phenomenon in real time through a real-time (RT) scheme capable of directly providing performance information of a running service rather than a near real-time (NRT) scheme for providing performance information after execution of an application service is terminated in order to immediately respond to performance problems.

In addition, a large amount of performance profile information can be collected and stored such that overhead is reduced when storing the large amount of performance profile information, so that causes of the performance problems can be effectively analyzed.

In addition, when the bottleneck phenomenon occurs, an exact bottleneck generation point can be automatically identified, and a bottleneck time can be calculated in real time.

Therefore, without assistance of an external expert, information technology (IT) staffs in a company can perform efficient performance management for an application service on their own by easily acquiring and utilizing results of real-time automatic analysis on performance bottleneck factors on an operating application service.

BEST MODE

In the following detailed description of the present invention, references are made to the accompanying drawings that show, by way of illustration, specific embodiments in which the invention may be practiced. These embodiments are described in sufficient detail to enable those skilled in the art to practice the invention. It shall be understood that various embodiments of the invention, although different from each other, are not necessarily mutually exclusive. For example, specific shapes, structures, and characteristics described herein may be implemented as being modified from one embodiment to another embodiment without departing from the spirit and scope of the invention. Furthermore, it shall be understood that locations or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout several aspects.

Hereinafter, various preferred embodiments of the present invention will be described in detail with reference to the accompanying drawings to enable those skilled in the art to which the invention pertains to easily implement the invention.

The present invention relates to a method for automatically analyzing a bottleneck phenomenon by remotely storing performance monitoring information on a server in real time in a unit of blocks.

According to a method for automatically analyzing a bottleneck according to an embodiment of the present invention, the automatic analysis can be performed on a bottleneck phenomenon in real time through a real-time (RT) scheme capable of directly providing performance information of a running service rather than a near real-time (NRT) scheme for providing performance information after execution of an application service is terminated in order to immediately respond to performance problems.

In addition, according to the method for automatically analyzing the bottleneck according to the embodiment of the present invention, a large amount of performance profile information can be collected and stored such that performance overhead is reduced when storing the large amount of performance profile information to effectively analyze causes of the performance problems.

In addition, according to the method for automatically analyzing the bottleneck according to the embodiment of the present invention, when the bottleneck phenomenon occurs, an exact bottleneck generation point can be automatically identified, and a bottleneck time can be calculated in real time.

Real-time performance analysis is required for an application operating server or the like that continuously provides a service for a predetermined time, such as a daemon service server or middleware such as a web application server (WAS). However, the real-time analysis may not be performed with current bottleneck analysis techniques.

In the following, a conventional method for analyzing performance of an application operating server will be described.

In a conventional application performance management (APM) scheme, business function execution performance is collected for performance analysis on an application operating server, and collected performance information is stored in a remote server after transaction is terminated. However, in the APM scheme, only a small number (average 2,000) of pieces of call information may be collected due to a burden to a memory caused by storing the performance information until the termination of the transaction.

In a conventional profiler scheme, execution performance for all functions may be collected, and the performance information may be stored locally. However, the profiler scheme is not applicable to an actual operating server because of large overhead caused by collecting all function performance information. In addition, integrated performance monitoring may be impossible since the information is locally stored.

In a conventional dump analysis scheme, a currently running function call stack may be collected. In addition, a manual command execution scheme may be performed. However, the dump analysis scheme may be a snapshot image of a currently running stack. Actual bottleneck determination may rely on estimation. In addition, a time spent for the bottleneck may not be measured.

As described above, conventional performance monitoring techniques may not analyze a fundamental performance bottleneck point due to characteristics and constraints of the techniques, and have limitations in effectively analyzing the bottleneck phenomenon.

According to the method for automatically analyzing the bottleneck according to the embodiment of the present invention, call stack information on an application function may be sent and stored in a unit of blocks (e.g., default value of 500) based on a predetermined period (e.g., default value of 2 seconds). The call stack information in the unit of blocks may be sent and stored in a remote saving server based on a user datagram protocol (UDP). The call stack information may be repeatedly sent and stored until termination of the performance analysis.

When the call stack information is send for each period, a current stack for a function of which execution is not completed may separately store only stack identifier information. When the execution of a corresponding function is completed in a next transmission period of the call stack information, a completion time may be recorded in separate delay stack information and sent to a performance information saving server.

When the call stack information is send for each period, a bottleneck analyzer may examine whether the collected call stack information is in an empty state. When the call stack information is in the empty state, the bottleneck analyzer may determine a current state as a bottleneck state in which a call to an application function is not in progress so that execution for a specific function (e.g., application interface (API) function) is stopped. In this case, bottleneck execution stack information may be acquired, and the number of bottlenecks may be counted as 1. The bottleneck execution stack information and bottleneck count information may be added to a bottleneck generation stack list of the service performance information, and may be sent to the performance information saving server and a monitoring client.

When first bottleneck execution stack information sent in a first transmission period is the same as second bottleneck execution stack information sent in a second transmission period, it may be determined that the execution is stopped for the same function, so that the bottleneck count information may be updated to a value obtained by increasing a bottleneck count by 1, and the updated bottleneck count information may be sent.

On the contrary, when the first bottleneck execution stack information sent in the first transmission period is not the same as the second bottleneck execution stack information sent in the second transmission period, it may be determined that a new bottleneck phenomenon has occurred by a new function.

In this case, the bottleneck count information (e.g., bottleneck count of 1) corresponding to the first bottleneck execution stack information and the second bottleneck execution stack information may be added to the bottleneck generation stack list of the service performance information. The bottleneck count information corresponding to the first bottleneck execution stack information and the second bottleneck execution stack information may be sent to the performance information saving server and the monitoring client. A bottleneck time for a specific call stack may be determined as Transmission period×Bottleneck count=Bottleneck time.

Due to characteristics of UDP transmission, a generation order of the call stack information may be mingled. Accordingly, a performance information providing server may sort the call stack information of the function, which is divided and stored in a unit of a plurality of blocks, such that the call stack information can be generated in a proper order, and may merge the call stack information with delay stack information, which is separately stored, so as to provide the merged information to the monitoring client.

A large amount of call stack information may be remotely stored by block-based multi-transmission in real time through the above approach, and simultaneously, an exact bottleneck point and a bottleneck time of a low level may be collected through an automatic bottleneck identification technique, so that the bottleneck phenomenon can be effectively analyzed.

Hereinafter, a specific method for automatically analyzing the bottleneck according to the embodiment of the present invention will be described. In the following, a lower module/lower component included in the application server may refer to one process unit/processing unit/operation execution unit.

Figure 1:
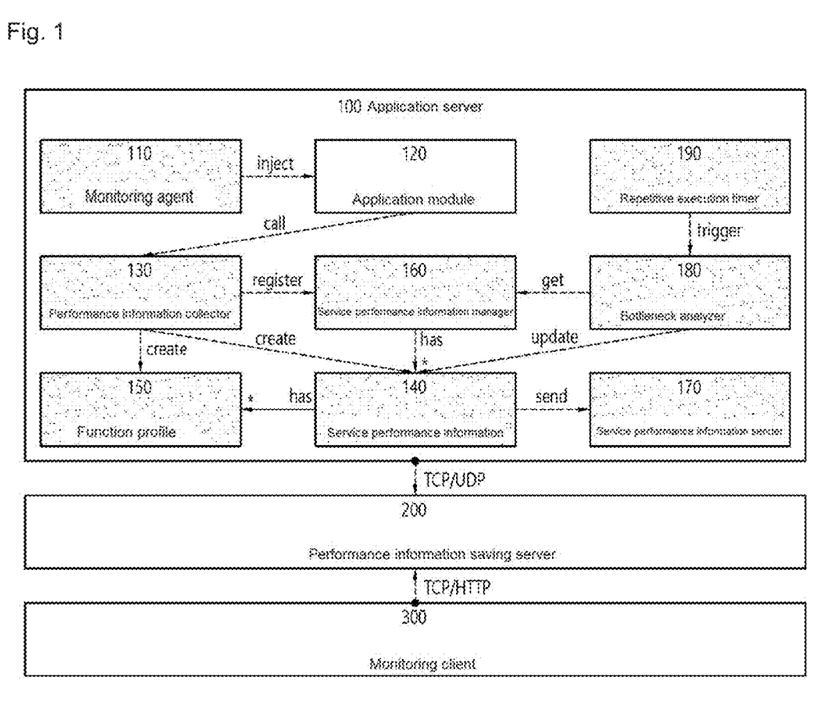
FIG. 1 is a conceptual diagram illustrating an automatic bottleneck analysis system according to an embodiment of the present invention.

FIG. 1 is a conceptual diagram illustrating an automatic bottleneck analysis system according to an embodiment of the present invention.

The automatic bottleneck analysis system for automatically analyzing a bottleneck phenomenon occurring on an application server will be described with reference to FIG. 1.

Referring to FIG. 1, the automatic bottleneck analysis system may include an application server 100, a performance information saving server 200, and a monitoring client 300.

The application server 100 is a performance monitoring target, and may be middleware such as a web application server (WAS) or a daemon service server on which an application that continuously provides a business service in an enterprise. A monitoring agent may be executed together with the application server in the form of a library to acquire service performance information of an application module. The application server 100 may send the service performance information to the performance information saving server through a network in real time.

The performance information saving server 200 may store the service performance information received from the application server in a memory cache and an internal storage. The collected service performance information may be sent to the monitoring client 300 based on a request for the service performance information by the monitoring client 300.

The monitoring client 300 may display various performance statuses on a performance dashboard screen based on the service performance information.

Hereinafter, specific operations for generating the service performance information of the application server according to the embodiment of the present invention will be described.

The monitoring agent 110 may operate at the start of a process of the application server.

The monitoring agent 110 may insert a code for calling a performance information collector 130 in start and end portions of functions in the application module 120 when a binary code of the application module 120 is loaded on a memory at the start of the process.

The application module 120 may be an existing business module for performing an application service that is a monitoring target. The application module 120 may send function execution information (name, IN/OUT parameters, exceptions, etc.) of the application module 120 by calling a performance information collector corresponding to a task role type of the function at the start and termination of calling the function.

The performance information collector 130 may be classified into six types. The performance information collector 130 formed in a type corresponding to a task role of the application module 120 may be called. As described above, the performance information collector 130 may be classified into the following six types according to the task role of the application module 120.

Type 1: Service performance information collector
Type 2: General function performance information collector
Type 3: SQL task performance information collector
Type 4: External system call performance information collector
Type 5: File input/output performance information collector
Type 6: Network input/output performance information collector The type of the application module 120 may be classified based on a role of the function. The type of the application module 120 may be used as a criterion for identifying a bottleneck section when bottleneck statistics are complied. All types of performance information collectors 130 may generate two calls at the start and termination of the execution of the function in the application module 120. A function profile 150 including a name, an input value, a start time, and the like of the corresponding function may be generated by the call at the start of the function, and an output value, an end time, a required time, error occurrence information, and the like of the corresponding function may be added to the function profile 150 by the call at the termination of the function.

The function profile 150 generated by the call at the start of the function in the application module 120 may be returned as a return value, and transmitted as an input value when the performance information collector 130 is called at the termination of the function.

Hereinafter, individual types will be described.

The performance information collector (Type 1; Service performance information collector) may be called in a start function related to a client request service for processing a service request of a client. In the call by the start function, service performance information 140 may be generated by collecting information such as a service ID, TxID, the start time, and a current execution function type, and the service performance information 140 may be registered in a service performance information manager 160. In a call at the termination for a next client request service, the end time, the required time, and the error occurrence information of a corresponding service may be added to the service performance information 140. The collected service performance information 140 may be deleted from the service performance information manager 160, and may be terminated.

The service performance information 140 deleted from the service performance information manager 160 may be transmitted to a service performance information sender 170 and sent to the performance information saving server 200 together with function profile information 150. In other words, based on a termination function for the service performance information 140, the service performance information 140 and the function profile 150 may be transmitted to the service performance information sender 170, and the service performance information sender 170 may send the service performance information 140 and the function profile 150 to the performance information saving server 200.

The performance information collector (Type 2: General function performance information collector) may collect performance information on a task based on an operation of a central processing unit (CPU). When a bottleneck phenomenon occurs due to the CPU operation-based task, a bottleneck type may be defined as "HANG_SVC".

The performance information collector (Type 3: Structured query language (SQL) task performance information collector) may collect performance information on an SQL task. When a bottleneck phenomenon occurs due to the SQL task, the bottleneck type may be defined as "HANG_SQL".

The performance information collector (Type 4: External system call performance information collector) may collect performance information on an operation linked with an external system. When a bottleneck phenomenon occurs due to the operation linked with the external system, the bottleneck type may be defined as "HANG_EAI".

The performance information collector (Type 5: File input/output performance information collector) may collect performance information on a file input/output task. When a bottleneck phenomenon occurs due to the file input/output task, the bottleneck type may be defined as "HANG_I/O".

The performance information collector (Type 6: Network input/output performance information collector) may collect performance information on a network input/output task. When a bottleneck phenomenon occurs due to the network input/output task, the bottleneck type may be defined as "HANG_N/W".

The service performance information 140 may contain execution performance information on a transaction that has occurred to process a client-side service request.

The service performance information 140 may include information on the service ID, the TxID, the start time, the end time, the required time, the error occurrence information, a total function call count, the current execution function type, the bottleneck type, a total bottleneck generation count, a bottleneck generation stack list, and the like.

The TxID is a universally unique identifier (UUID), and may be a unique identifier of a transaction that has occurred in a service.

The end time has an initial value of −1, and the end time may be recorded at the termination of the function. When the end time is −1, the service may be determined to be in a running state.

The total function call count is the number of application modules 120 called until the present.

The current execution function type may indicate one of the types of the performance information collector 130, and may be a criterion for determining the bottleneck type.

The bottleneck type may be determined by a bottleneck analyzer 180, and may be classified into "HANG_SVC", "HANG_SQL", "HANG_EAI", "HANG_I/O", and "HANG_N/W" according to the current execution function type.

The total bottleneck generation count is the number of times that a bottleneck is determined by the bottleneck analyzer 180. A total bottleneck time may be calculated according to an execution period of the bottleneck analyzer 180 as Execution period×Total bottleneck generation count.

The bottleneck generation stack list may include information on an execution stack where the bottleneck is generated, and the bottleneck count information, and the information on the execution stack where the bottleneck is generated and the bottleneck count information may be identified by the bottleneck analyzer 180 and stored in the bottleneck generation stack list.

The function profile 150 serves to store function call tree information of the application module 120 in a stack data structure. The information managed by the function profile 150 may include a block size, a start index, a start time, a function call stack list, a delay stack list, and the like.

The block size may refer to the maximum number of blocks that may be sent at one time when the function profile information is divided and sent in a unit of blocks. A default value of the block size is set to 500.

As described above, according to the method for automatically analyzing the bottleneck according to the embodiment of the present invention, the call stack information (or function call stack information) on the application function may be sent and stored in the unit of blocks (e.g., default value of 500) based on the predetermined period (e.g., default value of 2 seconds). The call stack information in the unit of blocks may be sent and stored in the remote saving server based on the user datagram protocol (UDP). The call stack information may be repeatedly sent and stored until the termination of the performance analysis.

The start index may be sequentially assigned from 0 when a function call stack is being occupied, and may be sent to the performance information saving server as a start index of a current block of the function profile 150 so as to be a criterion for sorting an order of the blocks.

The function call stack list may be subject to flush( ) so as to be emptied out and sent to the server if a current stack size is larger than the block size upon execution of push( ), or forcedFlush( ) may be executed according to the execution period of the bottleneck analyzer 180 to send the function call stack list to the server.

The delay stack list may contain information on a stack of which execution is not termination upon execution of server transmission. The delay stack list may be recorded with the completion time of the delay stack information completed in a subsequent transmission period, and additionally sent to the performance information saving server.

The service performance information manager 160 may serve to register the service performance information 140 on a currently running service in a list and to provide the information. The service performance information collector 130 may provide the service performance information 140 of a registered service, or the bottleneck analyzer may provide the service performance information 140 of a currently running service.

The service performance information sender 170 may serve to convert the service performance information 140 and the function profile information 150 into byte streams to send the converted byte streams to the performance information saving server 200 based on the UDP. A UDP transmission scheme rather than a transmission control protocol (TCP) transmission scheme may be used to rapidly process performance, which is called at a high frequency, to store the performance information in a remote storage.

The bottleneck analyzer 180 may be repeatedly executed based on a preset period through a repetitive execution timer 190, and may send the service performance information 140 and the function profile 150 to the performance information saving server 200 through the service performance information sender 170 upon the execution of the bottleneck analyzer 180. Upon the transmission to the performance information saving server 200, when a size of the function call stack list of the function profile 150 is 0 (or when the collected call stack information is in an empty state), it may be determined as a bottleneck phenomenon in which a call to the function of the application module 120 is not in progress so that execution is stopped at a specific function, and thus current execution stack information (or bottleneck execution stack information) may be acquired, and the number of bottlenecks may be counted as 1. The bottleneck execution stack information and the bottleneck count information may be added to the bottleneck generation stack list of the service performance information 140, and the bottleneck execution stack information may be sent to the performance information saving server 200 together with the bottleneck count information.

When the size of the function call stack list is still 0 upon transmission in a next period, and the bottleneck execution stack information is the same as the bottleneck execution stack information stored in a previous period, the bottleneck analyzer 180 may increase the existing number of bottlenecks by 1, and may send the number of bottlenecks after the update.

When the size of the function call stack list is still 0 upon the transmission in the next period, and the bottleneck execution stack information is not the same as the bottleneck execution stack information stored in the previous period, the bottleneck analyzer 180 may consider the case as occurrence of a new bottleneck phenomenon, may add current bottleneck execution stack information and bottleneck count information (bottleneck count of 1) to the bottleneck generation stack list, and may send the bottleneck execution stack information together with the bottleneck count information.

In this case, a bottleneck time for a specific call stack may be calculated as Transmission period×Bottleneck count. For example, when the bottleneck count is 30, it may mean that execution has been stopped at a corresponding execution stack for 60 seconds due to the bottleneck phenomenon.

When the bottleneck is identified as described above, the bottleneck type of the service performance information 140 is set to a corresponding value among HANG_SVC, HANG_SQL, HANG_EAI, HANG_I/O, and HANG_N/W according to the current execution function type, so that the bottleneck section may be explicitly identified by the monitoring client 300.

The repetitive execution timer 190 may serve to repeatedly execute the bottleneck analysis of the bottleneck analyzer 180 based on a preset period. For example, a default value set by the repetitive execution timer 190 may be 2 seconds, and the bottleneck analyzer may be executed every 2 seconds.

When the performance information saving server 200 intends to provide the performance information to the client, the generation order of the call stack information may be mingled due to the characteristics of the UDP transmission, so that the call stack information of the function, which is divided and stored in a unit of a plurality of blocks, may be sorted so as to be generated in a proper order. In addition, completion time information of a delay stack which is separately stored may be merged with the call stack information so that the merged information may be provided.

The monitoring client 300 may visualize and display the bottleneck types in service lists having a bottleneck by requesting the performance information from the performance information saving server 200. When a manager requests a detailed bottleneck stack list, the bottleneck generation stack list for the corresponding service may be output, and the manager may refer to a bottleneck point and a bottleneck time of a low level where the bottleneck has occurred through the bottleneck generation stack list.

Figure 2:
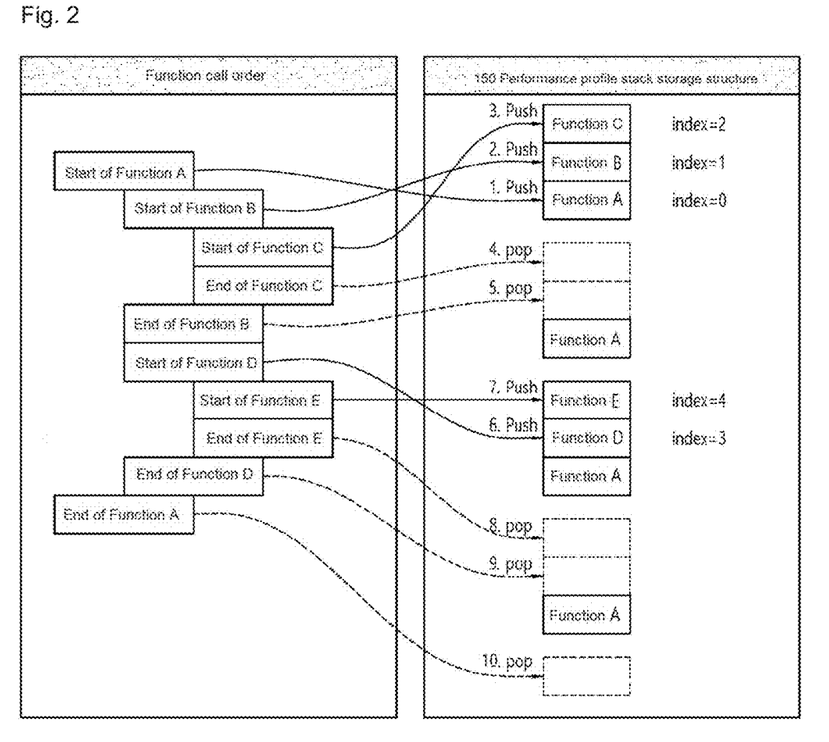
FIG. 2 is a conceptual diagram illustrating changes in a stack storage structure according to a function call according to the embodiment of the present invention.

FIG. 2 is a conceptual diagram illustrating changes in a stack storage structure according to a function call according to the embodiment of the present invention.

Referring to FIG. 2, changes in a stack storage structure in the function profile 150 according to a function call will be described.

The function call may be performed in the order of: start of Function A; start of Function B; start of Function C; end of Function C; end of Function B; start of Function ID, start of Function E; end of Function E; end of Function ID, and end of Function A.

In this case, a performance profile stack storage structure in a first state may include Function A of index(0), Function B of index(1), and Function C of index(2) based on the start of Function A, the start of Function B, and the start of Function C.

The performance profile stack storage structure in a second state may include only Function A of index(0) due to the end of Function B and the end of Function C.

The performance profile stack storage structure in a third state may include Function A of index(0), Function D of index(3), and Function E of index(4) due to the start of Function D and the start of Function E.

The performance profile stack storage structure in a fourth state may include only Function A of index(0) due to the end of Function D and the end of Function E.

The performance profile stack storage structure in a fifth state may be switched to an empty state due to the end of Function A.

Figure 3:
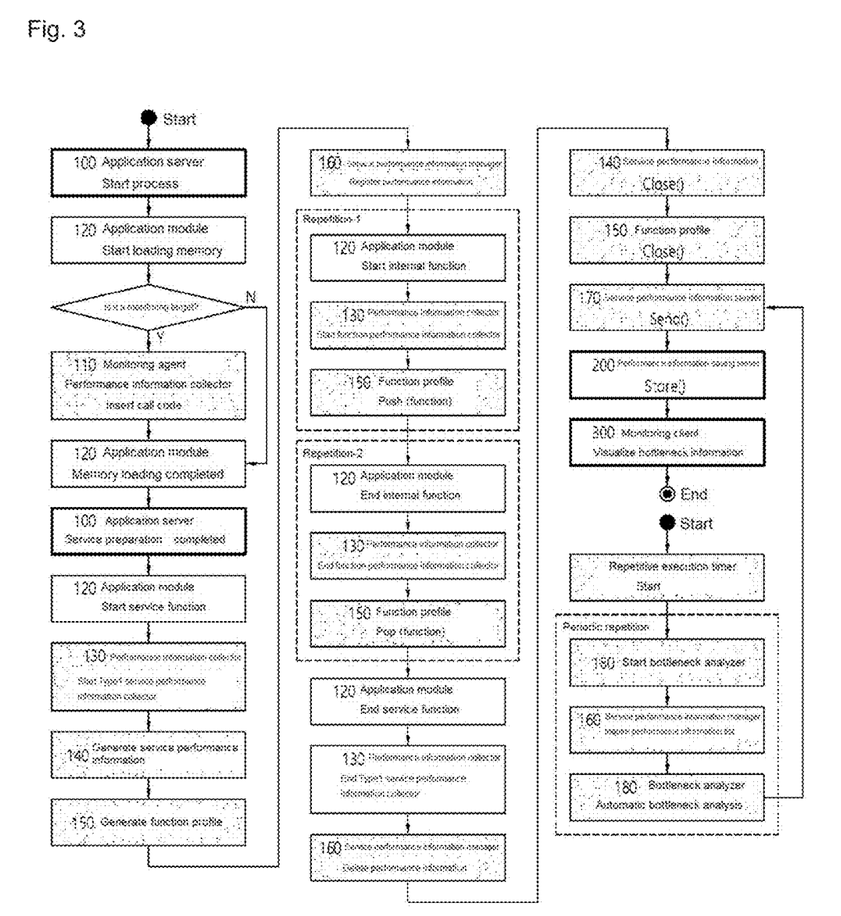
FIG. 3 is a flowchart illustrating an operation for generating service performance information of an application server according to the embodiment of the present invention.

FIG. 3 is a flowchart illustrating an operation for generating service performance information of an application server according to the embodiment of the present invention.

A method for generating and providing service performance information through an application server will be described with reference to FIG. 3.

Referring to FIG. 3, an application process may be started (S300).

Memory loading may be performed for the binary code of the application module 120 with the start of the application process (S302).

It is determined whether the application module is a monitoring target or not (S304), and when the application module 120 matches a monitoring target setting, a call code for the performance information collector 130 may be inserted by the monitoring agent 110 at start and end portions of functions in the module (S306).

The performance information collector 130 may be classified into six types, and a call code for the performance information collector 130 formed in a type corresponding to the application module 120 may be inserted.

All memory loading tasks for the application module 120 may be completed (S308), and the application server 100 may complete service preparation (S310).

A corresponding service function of the application module 120 for processing a service request generated from a client of the application server 100 may be started (S312).

The service performance information collector (Type 1) among the performance information collectors 130 may be called at the start of the service function according to the code which is previously inserted (S314).

At the start of the service performance information collector (Type 1), the service performance information 140 may be generated by collecting information such as the service ID, the TxID, the start time, the current execution function type, and the like (S316).

The function profile 150 may be generated (S318).

The service performance information 140 may be initialized by generating the function profile 150. The generated service performance information of the service may be registered in the service performance information manager 160 (S320).

Next, the start and termination of the functions in the application module 120 may be repeated in order to process the service. When an internal function of the application module 120 is started (S322), a start portion of the performance information collector 130 may be called (S324).

In this case, the performance information collector formed in a corresponding type among the types described above may be called according to the task role of the function.

At the start of the performance information collector 130, profile information including the name, the input value, the start time, and the like of the function may be generated and pushed to a stack of the function profile 150 (S326).

When the internal function of the application module is terminated (S328), an end portion of the performance information collector may be called (S330).

At the termination of the performance information collector, after performing Pop( ) on the stack of the function profile 150 to acquire the function profile information which is previously generated at the start, the output value, the end time, the required time, the error occurrence information, and the like of the function may be added to the function profile information (S332).

When the execution of all the functions in the application module 120 is terminated, the service function of the application module 120 may be terminated (S334), and at this time, an end portion of the service performance information collector (Type 1) among the performance information collectors may be called (S336).

At the termination of the service performance information collector (Type 1), the end time, the required time, the error occurrence information, and the like of the corresponding service may be added to the service performance information 140. The service performance information collected as described above may be deleted from the service performance information manager 160, and may be terminated (Close) (S338).

As the generation of the service performance information 140 is terminated (Close) (S340), the function profile 150 may be terminated (Close) (S342), and the function profile information 150 may be transmitted together with the service performance information 140 upon a transmission (Send) call of the service performance information sender 170 (S344).

The function profile information 150 may be transmitted together with the service performance information 140 to the performance information saving server 200 in the UDP transmission scheme based on the transmission (Send) of the service performance information sender 170.

Meanwhile, the repetitive execution timer 190, which is executed by an additional thread separated at the start, may be repeatedly executed according to a preset period (default value of 2 seconds) (S380) to call a start portion of the bottleneck analyzer 180 (S382).

At the start of the bottleneck analyzer 180, a performance list of a running service registered in the service performance information manager 160 may be inquired (S384). The automatic bottleneck analysis of the bottleneck analyzer 180 may be performed based on the list (S386).

As described above, in the automatic bottleneck analysis of the bottleneck analyzer 180, when a size of the function call stack list (or call stack list) in the function profile is 0 (or when the collected call stack information is in the empty state) as a result of examination, it may be determined as a bottleneck phenomenon in which a call to the function of the application module is not in progress so that execution is stopped at a specific function.

The current execution stack information may be acquired to count the number of bottlenecks as 1, and such a pair of pieces of information may be added to the bottleneck generation stack list of the service performance information 140, so that the execution performance information and the function profile information up to now may be sent to the performance information saving server according to the transmission (Send) call of the service performance information sender.

When the size of the function call stack list is still 0 upon the transmission in the next period, and the execution stack information at this time is the same as the execution stack information stored in the previous period, the existing number of bottlenecks may be increased by 1, and may be sent after the update. When the above pieces of execution stack information do not match, it may be considered as generation of a new bottleneck, a current execution stack and a bottleneck count of 1 may be added to the bottleneck generation stack list may be sent together. In this case, a bottleneck time for a specific call stack may be calculated as Transmission period×Bottleneck count.

When the bottleneck is identified as described above, the bottleneck type of the service performance information 140 is set to a corresponding type among HANG_SVC, HANG_SQL, HANG_EAI, HANG_I/O, and HANG_N/W according to the current execution function type, so that the bottleneck section may be explicitly identified by the monitoring client 300.

The storage (Store) of the performance information saving server 200 may store the performance information received from the service performance information sender 170 (S346). Upon visualization of bottleneck information of the monitoring client 300 (S348), the generation order of the call stack information may be mingled due to the characteristics of the UDP transmission, so that the call stack information of the function, which is divided and stored in a unit of a plurality of blocks, may be sorted so as to be generated in a proper order, and the completion time information of the delay stack which is separately stored may be merged with the call stack information so as to provide the performance information.

As described above, according to the method for automatically analyzing the bottleneck according to the embodiment of the present invention, the call stack information on the application function may be sent and stored in the unit of blocks (e.g., default value of 500) based on the predetermined period (e.g., default value of 2 seconds). The call stack information in the unit of blocks may be sent and stored in the remote saving server based on the user datagram protocol (UDP). The call stack information may be repeatedly sent and stored until the termination of the performance analysis.

Figure 4:
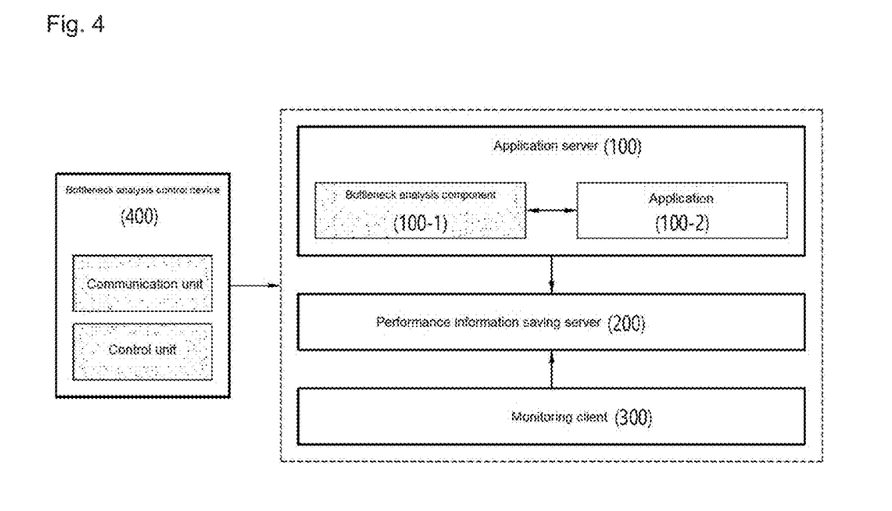
FIG. 4 is a conceptual diagram illustrating a method for providing a bottleneck analysis service according to the embodiment of the present invention.

FIG. 4 is a conceptual diagram illustrating a method for providing a bottleneck analysis service according to the embodiment of the present invention.

In FIG. 4, operations of a bottleneck analysis control device for providing the bottleneck analysis service described above with reference to FIGS. 1 to 3 will be described.

Referring to FIG. 4, a bottleneck analysis control device 400 may provide an analysis service for a bottleneck phenomenon on a network to the monitoring client 300.

In order to provide a service for the automatic bottleneck analysis, the bottleneck analysis control device 400 may send a bottleneck analysis application (or a bottleneck monitoring application, a bottleneck analysis component, a bottleneck analysis module) 100-1 to the application server 100, and set the performance information saving server 200 and the monitoring client 300.

The bottleneck analysis control device 400 may include a processor and a communication unit, wherein the processor may be implemented fora control for driving the bottleneck analysis control device 400, and the communication unit may be operatively connected to the processor to perform communication with the application server 100, the performance information saving server 200, the monitoring client 300, and the like.

The bottleneck analysis control device may be implemented to provide the bottleneck analysis component 100-1. Similarly, an application server which is subject to automatic bottleneck analysis in real time may include: a communication unit implemented to receive a bottleneck analysis component; and a processor operatively connected with the communication unit. The processor may be implemented to install the bottleneck analysis component 100-1, the bottleneck analysis component 100-1 may add a call code for a performance information collector to an application installed on the application server that is a monitoring target, and the bottleneck analysis component 100-1 may generate service performance information for analyzing a bottleneck phenomenon by calling the performance information collector according to execution of a service function of the application requested by a client.

The bottleneck analysis component 100-1 may be implemented to drive operations for analyzing the bottleneck phenomenon, which are performed on the application server 100/performance information saving server 200/monitoring client 300 described above with reference to FIGS. 1 to 3.

For example, the bottleneck analysis component 100-1 may add the call code for the performance information collector to an application module (or application 100-2) that is a monitoring target, and may generate the service performance information by calling the performance information collector according to execution of a service function of the application module requested by the client.

In addition, the bottleneck analysis component 100-1 may generate function profile information, and may send the service performance information and the function profile information collected by the performance information collector to the performance information saving server upon termination of the service function.

As described above, the service performance information may include bottleneck-related information, and the bottleneck analyzer may generate the bottleneck-related information based on the function call stack information that is sent and stored in a unit of a preset number of blocks for each preset period. The bottleneck-related information may include a bottleneck type, a total number of generated bottlenecks, a bottleneck generation stack list, and the like.

The bottleneck analyzer may determine the bottleneck phenomenon when the size of the call stack list is 0, and the bottleneck-related information may include the bottleneck execution stack information on a bottleneck execution stack causing the bottleneck phenomenon, and the bottleneck count information.

The bottleneck-related information may include current execution function type information, and the current execution function type information may include information on a type of the service function to allow the monitoring client to identify the bottleneck section.

The embodiments according to the present invention as described above may be implemented in the form of program instructions that can be executed by various computer components, and may be stored on a computer-readable recording medium. The computer-readable recording medium may include program instructions, data files, data structures, and the like alone or in combination. The program instructions stored on the computer-readable recording medium may be specially designed and configured for the present invention, or may also be known and available to those skilled in the computer software field. Examples of the computer-readable recording medium include: magnetic media such as hard disks, floppy disks, and magnetic tapes; optical recording media such as CD-ROMs and DVDs; magneto-optical media such as floptical disks; and hardware devices specially configured to store and execute program instructions, such as ROM, RAM, and flash memories. Examples of the program instructions include not only machine language codes generated by a compiler or the like, but also high-level language codes that can be executed by a computer using an interpreter or the like. The hardware devices may be changed into one or more software modules to perform the operations of the present invention, and vice versa.

Although the present invention has been described above in connection with specific limitations such as detailed components as well as limited embodiments and drawings, these are merely provided to assist a better understanding generally of the invention, and the present invention is not limited to the above embodiments. In addition, it shall be understood that various changes and modifications can be made from the above description by those skilled in the art to which the invention pertains.

Therefore, the spirit of the present invention shall not be limited to the above-described embodiments, and the entire scope of the appended claims and their equivalents will fall within the scope and spirit of the invention.

The invention claimed is:

1. A method for automatically analyzing a bottleneck in real time, the method comprising:
receiving a bottleneck analysis component by an application server; and
installing the bottleneck analysis component by the application server,
wherein the bottleneck analysis component adds a call code for a performance information collector to an application installed on the application server that is a monitoring target, and
the bottleneck analysis component generates service performance information for analyzing a bottleneck phenomenon by calling the performance information collector according to execution of a service function of the application requested by a client,
wherein the bottleneck analysis component is implemented to generate function profile information of the application, and
the bottleneck analysis component is implemented to send the service performance information and the function profile information collected by the performance information collector to a performance information saving server upon termination of the service function,
wherein the service performance information includes bottleneck-related information,
the function profile information includes function call stack information, and
a bottleneck analyzer generates the bottleneck-related information based on the function call stack information that is sent and stored in a unit of a preset number of blocks for each preset period.

2. The method of claim 1,
wherein the bottleneck analyzer determines the bottleneck phenomenon when a size of a function call stack list is 0, and
the bottleneck-related information includes information on a bottleneck execution stack causing the bottleneck phenomenon and information on a number of bottlenecks caused by the bottleneck execution stack.

3. The method of claim 2,
wherein the bottleneck-related information includes bottleneck type information, and
the bottleneck type information includes information on a type of the service function to allow a monitoring client to identify a bottleneck section.

4. An application server which is subject to automatic bottleneck analysis in real time, the application server comprising:
a communication unit implemented to receive a bottleneck analysis component; and
a processor operatively connected with the communication unit,
wherein the processor is implemented to install the bottleneck analysis component,
the bottleneck analysis component adds a call code for a performance information collector to an application installed on the application server that is a monitoring target, and
the bottleneck analysis component generates service performance information for analyzing a bottleneck phenomenon by calling the performance information collector depending on execution of a service function of the application requested by a client,
wherein the bottleneck analysis component is implemented to generate function profile information of the application, and
the bottleneck analysis component is implemented to send the service performance information and the function profile information collected by the performance information collector to a performance information saving server upon termination of the service function,
wherein the service performance information includes bottleneck-related information,
the function profile information includes function call stack information, and
a bottleneck analyzer generates the bottleneck-related information based on the function call stack information that is sent and stored in a unit of a preset number of blocks for each preset period.

5. The application server of claim 4,
wherein the bottleneck analyzer determines the bottleneck phenomenon when a size of a function call stack list is 0, and
the bottleneck-related information includes information on a bottleneck execution stack causing the bottleneck phenomenon and information on a number of bottlenecks caused by the bottleneck execution stack.

6. The application server of claim 5, wherein the bottleneck-related information includes bottleneck type information, and
the bottleneck type information includes information on a type of the service function to allow a monitoring client to identify a bottleneck section.

7. A non-transitory computer-readable recording medium having instructions for:
receiving a bottleneck analysis component by an application server; and
installing the bottleneck analysis component by the application server,
wherein the bottleneck analysis component adds a call code for a performance information collector to an application installed on the application server that is a monitoring target, and
the bottleneck analysis component generates service performance information for analyzing a bottleneck phenomenon by calling the performance information collector according to execution of a service function of the application requested by a client,
wherein the bottleneck analysis component is implemented to generate function profile information of the application; and
the bottleneck analysis component is implemented to send the service performance information and the function profile information collected by the performance information collector to a performance information saving server upon termination of the service function, wherein the service performance information includes bottleneck-related information, the function profile information includes function call stack information, and a bottleneck analyzer generates the bottleneck-related information based on the function call stack information that is sent and stored in a unit of a preset number of blocks for each preset period.

8. The non-transitory computer-readable recording medium of claim 7, wherein the bottleneck analyzer determines the bottleneck phenomenon when a size of a function call stack list is 0, and the bottleneck-related information includes information on a bottleneck execution stack causing the bottleneck phenomenon and information on a number of bottlenecks caused by the bottleneck execution stack.

9. The non-transitory computer-readable recording medium of claim 8, wherein the bottleneck-related information includes bottleneck type information, and the bottleneck type information includes information on a type of the service function to allow a monitoring client to identify a bottleneck section.

\* \* \* \* \*